March 25, 1969 W. C. BELK 3,434,583
ARTICLE ALIGNING DEVICE AND METHOD
Filed Oct. 25, 1966 Sheet 1 of 6

INVENTOR
WILBER C. BELK
BY Francis W. Anderson
ATTORNEY

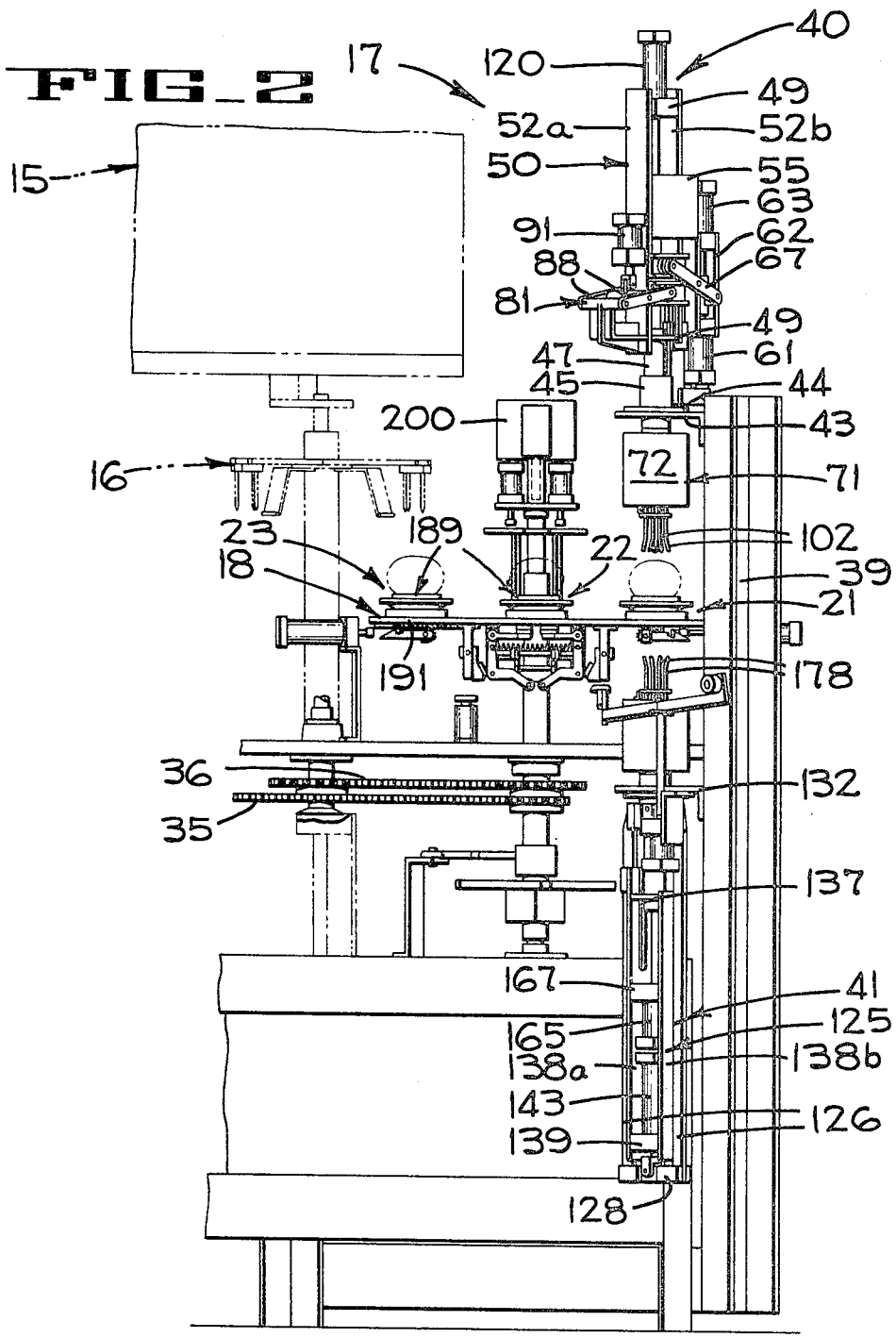

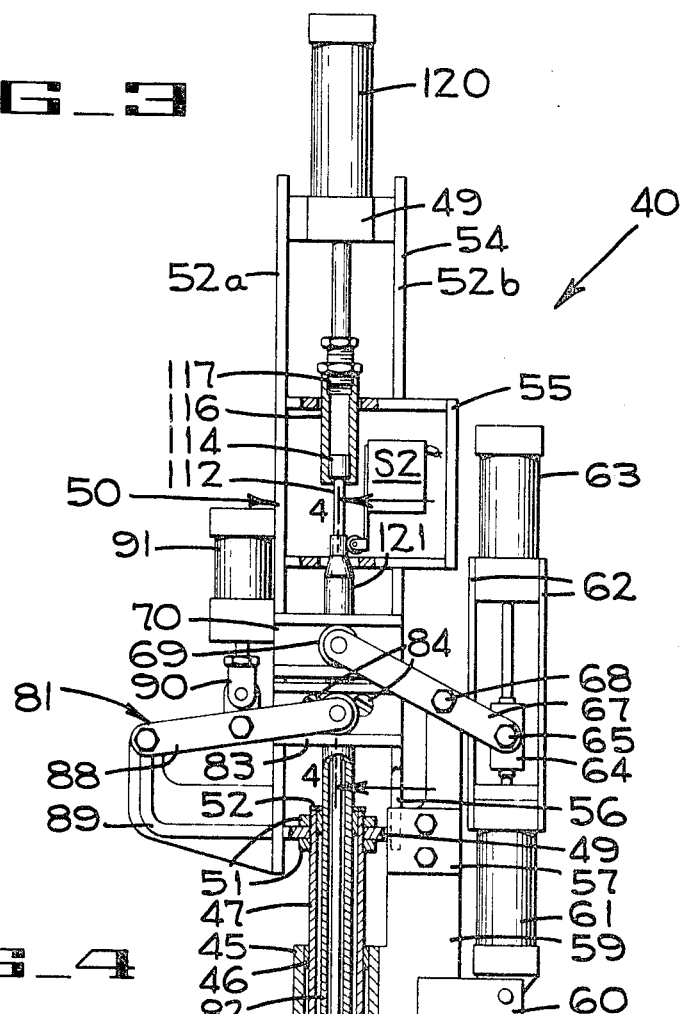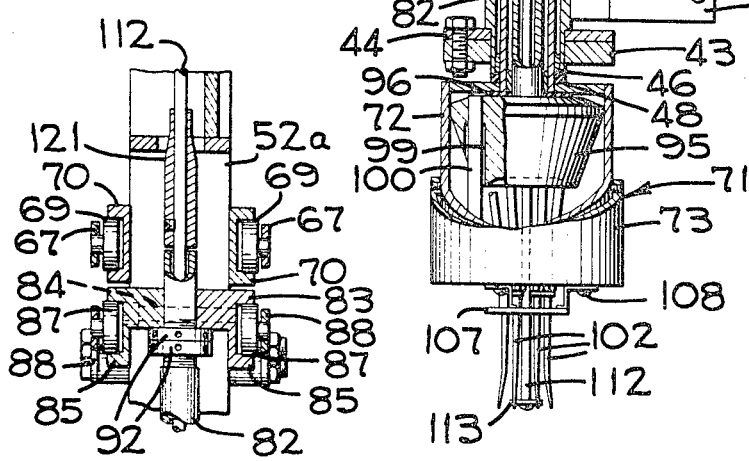

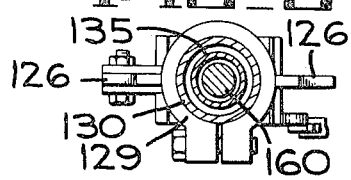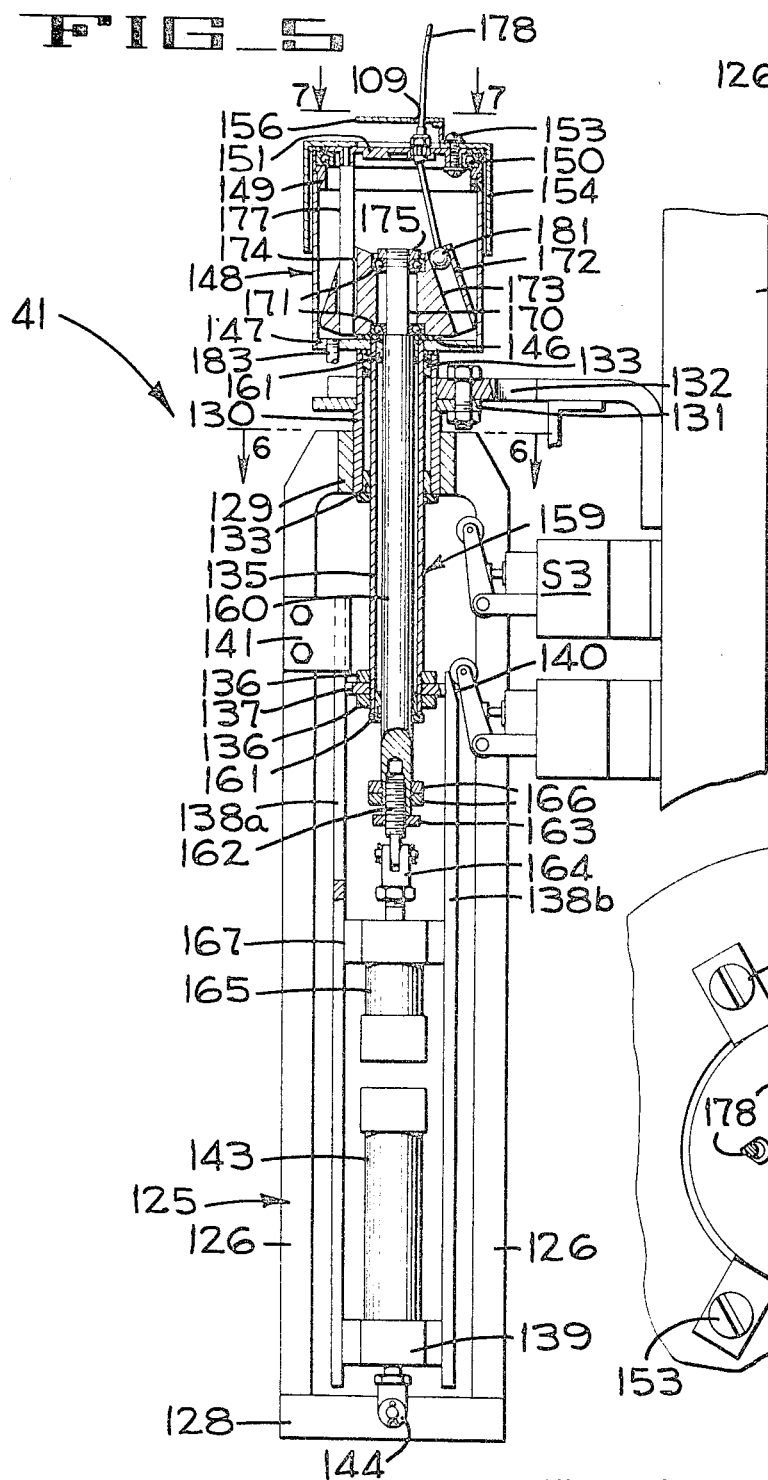

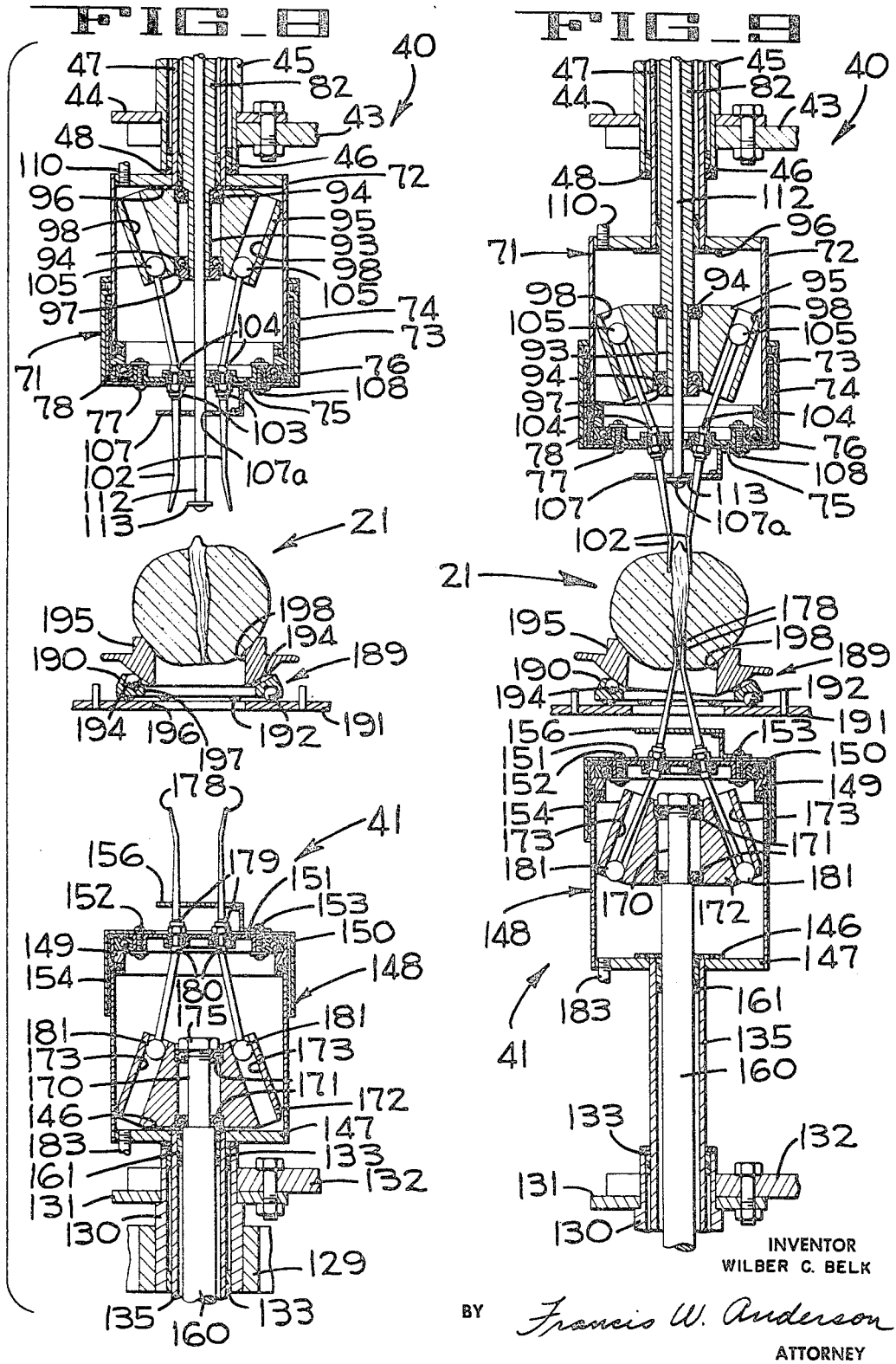

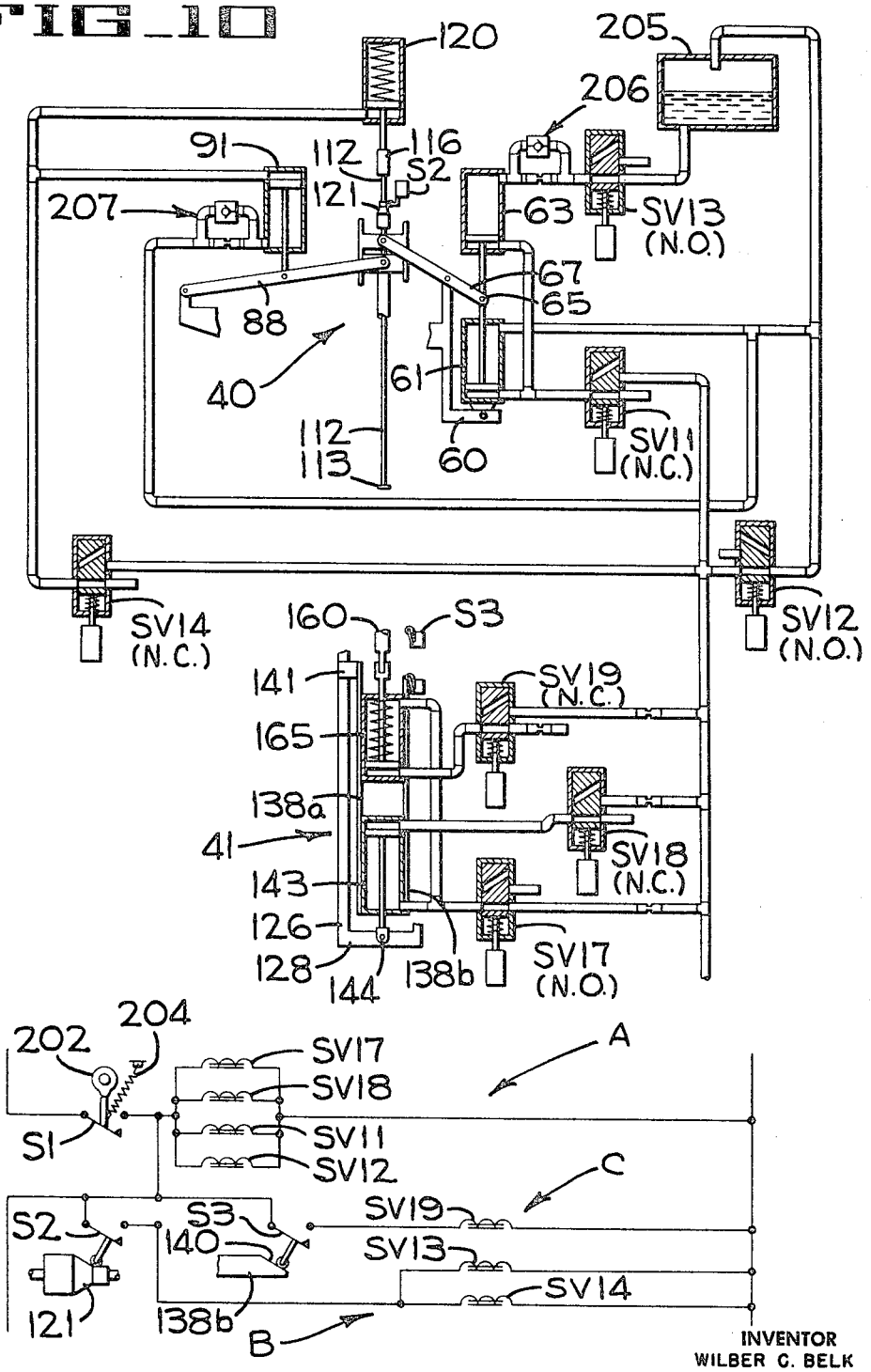

United States Patent Office 3,434,583
Patented Mar. 25, 1969

3,434,583
ARTICLE ALIGNING DEVICE AND METHOD
Wilber C. Belk, Lakeland, Fla., assignor to FMC Corporation, San Jose, Calif., a corporation of Delaware
Filed Oct. 25, 1966, Ser. No. 589,277
Int. Cl. B65g 47/24, 47/80
U.S. Cl. 198—33                                    13 Claims

ABSTRACT OF THE DISCLOSURE

Apparatus for aligning citrus fruit so that its stem-blossom axis is vertically disposed, comprising an upper cluster of vertically disposed pins and a lower cluster of vertcially disposed pins, a laterally and angularly freely movable fruit holder disposed between said vertical pins and having a hole aligned therewith, an actuator for vertically reciprocating the clusters of pins to move them toward one another and penetrate the upper and lower ends of a citrus fruit resting in said fruit holder, and further actuators for closing the clusters of pins after they have penetrated the fruit into more tightly grouped clusters such that the pins move against the tough center core of the fruit and align it along the axis between the centers of the two clusters of pins. A method of aligning citrus fruit by supporting the fruit for free angular lateral movement, penetrating the soft flesh of the fruit and pressing against the tough center core at opposite ends thereof to urge each end of the citrus fruit in a direction toward a common axis.

Description of the invention

This invention pertains to an article aligning device and a method of aligning articles and more particularly concerns a device and a method for aligning citrus fruit, such as oranges and grapefruit.

In handling and processing articles of any kind, it is often necessary that they be positioned so that their axes have a predetermined orientation before the processing tools are moved into engagement with them. Particularly is this so in the case of processing citrus fruit. For example, in processing grapefruit in one type of machine, it is necessary that the stem-blossom axis of each fruit be disposed in a vertical position if the tools are to operate most effectively. Heretofore, it has been difficult to obtain this positive orientation of the stem-blossom axes of grapefruit with the speed and accuracy necessary for a commercial operation.

One of the prior art methods and apparatus for aligning fruit is disclosed in the patent to Polk, 3,132,734. This patent describes a machine and method which employ the principle of fixing the top end of a fruit at the stem-blossom axis and pivoting the bottom end of the fruit about the fixed point by penetrating the bottom end of the fruit with a plurality of pins and closing the pins on the core material surrounding the stem-blossom axis. This principle, in some cases, is not always effective since its accuracy is dependent upon the initial location of the stem-blossom axis relative to the fixed pivot point. In addition, the movement of the lower end of the fruit acted on by the pins is sometimes restricted by the surface supporting the fruit causing the pins to damage the flesh of the fruit.

Applicant's invention employs a principle different from that described and greatly improves the effectiveness of the aligning procedure. Contrary to the teachings of the above patent, applicant does not fix the upper end of the fruit but aligns the fruit by using two sets of pins acting at opposite ends of the fruit and around the stem-blossom axis while the fruit is supported for both angular and lateral movement. In effect, applicant's invention is similar to suspending the fruit between the two sets of pins and centering both ends so that the stem-blossom axis is moved into alignment along a line drawn through the centers of the two sets of pins. This has surprisingly and greatly improved the alignment procedure since the fruit are not only more effectively aligned than in the prior art machines but receive considerably less damage during the alignment procedure.

It is an object, therefore, of this invention to provide an improved article aligning method and apparatus.

Another object of the invention is to provide a method of aligning citrus fruit by centering both ends of the fruit.

Still another object of the invention is to provide a method of aligning citrus fruit by supporting the fruit in a manner to allow free lateral and angular movement thereof while centering both ends of the fruit.

Another object of the invention is to provide a machine for aligning citrus fruit by closing two sets of opposed centering pins on the core of the fruit but allowing the pins to move laterally limited amounts so as to follow the partitions separating the sections of the fruit.

Other objects and advantages will be apparent from the following detailed description accompanied by the drawings, in which:

FIGURE 2 is an elevation, partly broken away, of the apparatus shown in FIGURE 1 as viewed generally in the direction of the arrows 2—2 of FIGURE 1.

FIGURE 3 is an enlarged section taken along the line 3—3 of FIGURE 1 with parts of the device broken away for clarity.

FIGURE 4 is an enlarged fragmentary section taken along the line 4—4 of FIGURE 3.

FIGURE 5 is an enlarged elevation of the device as viewed generally in the direction of the arrows 5—5 in FIGURE 1 and with parts broken away for clarity.

FIGURE 6 is an enlarged section taken along the line 6—6 of FIGURE 5.

FIGURE 7 is an enlarged fragmentary section taken along the line 7—7 of FIGURE 5.

FIGURE 8 is an enlarged longitudinal, fragmentary section of the device showing a fruit in position to be aligned.

FIGURE 9 is also an enlarged longitudinal, fragmentary section of the device showing a fruit in position after it has been aligned.

FIGURE 10 is a schematic pneumatic diagram showing the various pneumatic actuators generally in relationship with the parts they control.

FIGURE 11 is a schematic wiring diagram.

Figure 1:
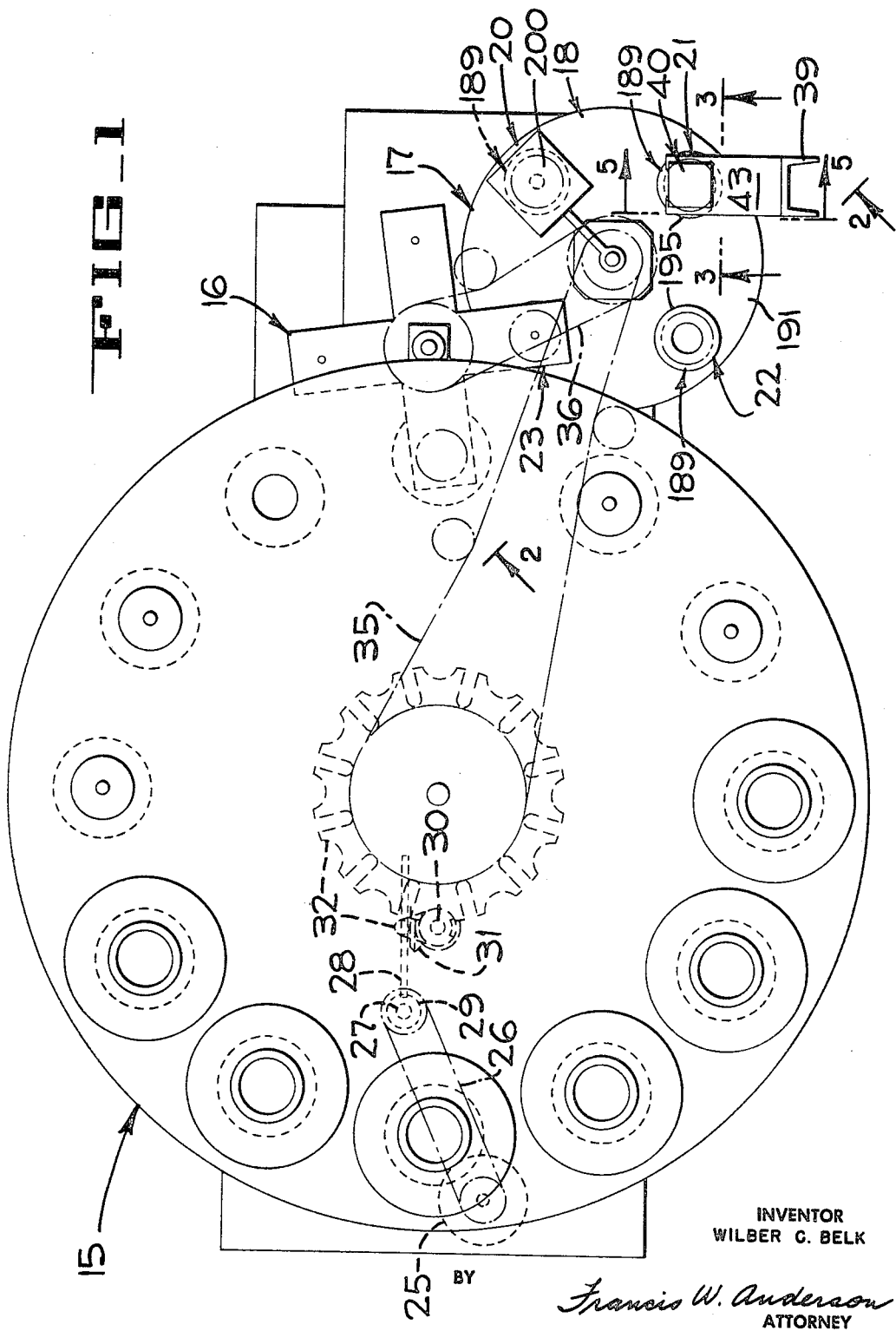
FIGURE 1 is a schematic plan of one embodiment of the aligning device capable of carrying out a method in accordance with the principles of the invention and showing the aligning device located with respect to parts of a fruit sectionizing machine with which it is used.

The general description of the preferred embodiment of the invention is best obtained by referring to FIGURE 1 wherein the reference numeral 15 indicates generally a grapefruit sectionizer with which the subject invention is employed. A transfer mechanism 16 and a feeder 17 are associated with the sectionizer, the feeder moving the fruit to the transfer mechanism which, in turn, places the fruit in the sectionizer. The feeder comprises a rotary turret 18 which moves clockwise, as viewed in FIGURE 1, through four respective stations, namely, an input station 20, a centering or aligning station 21, an inactive station 22, and a transfer station 23. The fruit are individually placed on the feeder at the input station, are then aligned at the centering station and finally are picked up at the transfer station by the transfer mechanism which also rotates in a clockwise direction in timed relation with the feeder. The transfer mechanism then places the fruit in the sectionizer which also is moved in a clockwise direction in timed relation with the transfer mechanism.

The drive for the apparatus thus far described is shown in dotted lines in FIGURE 1 and includes a motor 25 which is mounted on the sectionizer 15 and is connected through a conventional belt drive 26 to a vertical shaft 27. A horizontal shaft 28 which is driven from the shaft 27 through a worm gear drive 29, drives a second vertical shaft 30 by means of a bevel gear drive 31. The vertical shaft 30 effects intermittent movement of the sectionizer through a Geneva drive mechanism 32. The details of the drive thus far described are identical with the drive shown in the aforementioned Polk, Jr. patent. Accordingly, further details of that drive may be obtained from the patent and will not be further included herein.

The feeder turret 18 is connected to the Geneva drive mechanism 32 by a long chain drive 35. A second smaller chain drive 36 connects the feeder turret 18 with the transfer mechanism 16. As can be readily seen, the motor 25 which drives the sectionizer 15, also drives the feeder and the transfer mechanism in timed relation with the sectionizer.

Further details of the sectionizer and the transfer mechanism may also be obtained from the aforementioned Polk, Jr. patent and the patents cited therein whereas, further details of the feeder may be obtained from the commonly owned copending application of W. C. Belk, B. N. Willis and C. T. Mulford, entitled Fruit Handling Apparatus Ser. No. 589,315 and filed Oct. 25, 1966.

The aligning device, as best shown in FIGURES 2, 3 and 5, is situated at the centering station 21 and is mounted on a sationary frame 39. The aligining device comprises an upper centering mechanism 40 and a lower centering mechanism 41.

The upper centering mechanism 40 is best shown in FIGURE 3 and comprises a horizontal frame member 43 which is fixed to the frame 39 as by welding. A mounting bracket 44 is bolted to the horizontal frame member and, fixed to the mounting bracket and extending through an aperture therein, is a cylindrical support 45. The cylindrical support has a pair of upper and lower annular bushings 46 which slidably receive a cylindrical positioning tube 47. The bushings are made of any suitable low friction material such as nylon. A rubber washer 48 is provided at the lower end of the cylindrical support and acts as a bumper for a purpose to be later described.

The cylindrical positioning tube 47, which is mounted for reciprocating movement within the cylindircal support 45, is connected at its upper end to the lowermost of several crossbars 49 of a generally rectangular support frame 50 by a pair of locking nuts 51. A second rubber washer 52 is positioned abutting the top end of the cylindrical positioning tube and likewise serves as a bumper for a purpose later to be described.

The rectangular support frame 50 includes a pair of opposed vertical bars 52a and 52b connected by the crossbars 49. The righthand (as viewed in FIGURE 3) vertical bar 52b has an upper portion 54, an offset portion 55 and a lower forked portion 56. The lower forked portion forms a guide slot (not shown) which straddles and contacts a nylon guide block 57. The guide block 57 maintains the rectangular support frame 50 in proper alignment during reciprocation thereof and is fastened to an upright bracket 59 which is welded at its lower end to the cylindrical support 45. The upright bracket 59 is provided with a pair of spaced, outwardly extending ears 60. Pinned to the ears for pivotal movement is the lower end of pneumatic actuator 61. The upper end of the pneumatic actuator is connected to a pair of spaced vertical arms 62, the upper ends of which are bolted to the lower end of a hydraulic-pneumatic actuator 63. Each of the actuators 61 and 63 and each of the pneumatic actuators hereinafter to be described includes a conventional cylinder, piston and actuating rod. The actuating rods of the actuators 61 and 63 are adjustably fastened to a threaded sleeve 64. A pivot bolt 65 is fastened to the threaded sleeve and, when the threaded sleeve is moved by the actuators, it acts as a driving member to raise and lower the positioning tube 47.

In order to raise and lower the positioning tube 47, a pair of spaced pivot arms 67 are connected at their ends to the pivot bolt 65. The pivot arms are apertured near their centers to receive a center pivot bolt 68 which is connected to the upper end of the upright bracket 59. Mounted on the distal ends of the pivot arms 67 are a pair of rollers 69 (FIG. 4) which ride in spaced horizontal guide flanges 70 mounted between the vertical bars 52a and 52b. As can be readily seen, reciprocatory movement of the threaded sleeve 64 by the actuators 61 and 63 causes the pivot arms 67 to oscillate about the center pivot bolt, causing the rollers to ride along the horizontal guide flanges, and thus reciprocate the rectangular support frame 50 up and down. Since the rectangular support frame is connected to the positioning tube 47 through the locking nuts 51, reciprocation is also transmitted to the positioning tube.

Referring now to FIGURES 3 and 8, the bottom of the positioning tube 47 is fastened to an upper centering assembly 71 which comprises a cylindrical housing 72. A protective cover 73 encircles the lower end of the housing and opens downwardly. Disposed between the protective cover and the housing is a cylindrical bearing cup 74 having a bottom which extends radially inward of the housing and which mounts a bearing plate 75. A plurality of bearings 76 rest on the inside surface of the bearing plate and are held in place by a plurality of cap screws 77. The bearings are also pressed into an adaptor ring 78 which is fastened to the inside of the housing 72. As can be readily seen, the bearings permit the bearing plate to rotate on the housing.

Referring again to FIGURE 3, a centering pin actuating assembly 81 comprises an actuating tube 82 which is clamped at its upper end by a two piece sliding block 83 (FIG. 4) which slidably engages the opposed vertical bars 52a and 52b of the rectangular support frame 50. A pair of cap screws 84, only one shown in dotted lines, are spaced on either side of the actuating tube and hold the sliding block clamped together on the actuating tube. The sliding block is provided with a pair of horizontal guide flanges 85 which receive a pair of rollers 87 mounted for rotation on the ends of a pair of elongated lever arms 88. The free ends of the lever arms are pivotally mounted to an extension member 89 which is welded to the lefthand vertical bar 52a. The lever arms are pivotally connected approximately at their midpoints to a clevis 90 which is adjustably connected to the actuating rod of a pneumatic actuator 91. This actuator is rigidly fastened to the lefthand vertical bar 52a. A set of adjusting nuts 92 (FIG. 4) are threaded on the shaft 82 to limit its downward movement by contacting the bumper or washer 52. As can be readily seen, reciprocation of the actuating rod by the pneumatic actuator 91 results in reciprocation of the actuating tube 82.

As is best shown in FIGURES 3 and 8, the upper centering assembly 71 further includes the bottom end of the actuating tube 82 which is recessed as at 93 to receive a pair of longitudinally spaced bearings 94. The outer races of the bearings are positioned in recesses formed in a centering pin operating block 95. A rubber washer 96 circumscribes the actuating tube and rests on the top of the operating block to serve as a bumper for the operating block. A locking nut 97 is threaded onto the end of the actuating tube and retains the bearings and operating block on the actuating tube. The operating block is provided with a plurality of equi-distantly spaced inclined bores 98 and a vertical guide bore 99 (FIG. 3). The vertical guide bore slidably receives a guide pin 100 which is fastened to the bearing plate 75 by a cap screw (not shown). As can be readily seen, when the operating block is moved up and down by the actuating tube it will always maintain its position with respect to the bearing plate by the guide pin. As also can be readily seen, however, the operating block, guide pin and bearing plate may all rotate with respect to the housing 72 and the actuating tube 82.

Referring again to FIGURE 8, a plurality of elongated centering fingers or pins 102 are swivelly connected to the bearing plate 75 and are retained against longitudinal movement thereof by a plurality of lock nuts 103 and a cylindrical abutment 104 formed integrally on each of the pins. The pins are slightly bent outwardly with respect to the longitudinal axis of the actuating tube 82 at each of their ends. The upper ends of the pins are fixed to ball guides 105 which are mounted for sliding movement in the inclined bores 98 of the centering pin operating block 95. The lower ends of the pins are tapered slightly and upon reciprocatory movement of the actuating block 95 will oscillate about the bearing plate inwardly and outwardly of the longitudinal axis of the actuating tube. As the actuating tube moves the pin actuating block downwardly the ball guides are moved radially outward in the inclined bores and the bottom ends of the pins, due to their swivel connections to the bearing plate, will simultaneously move inwardly. The pins, however, because of their swivel mountings, if left unrestrained can also move laterally.

In order to limit the amount of lateral movement, a restraining member 107 is fastened to the bearing plate 75 by capscrews 108. In FIGURE 7, a restraining member 156 for the lower centering mechanism 41 which is identical with the restraining member 107, with the exception that the latter has a central aperture 107a is shown provided with a plurality of equi-distantly spaced, diamond-shaped apertures 109. When the pins are retracted or moved radially outward, they move into the outermost corners of the similar diamond-shaped apertures in the restraining plate 107. As the fingers are moved radially inward they are free to move toward the centermost corners of the diamonds and thus are free for a limited amount of lateral movement; however, as the pins come closer together they are again moved in to the innermost corners of the apertures and are prevented from overlapping. In the case of grapefruit, the pins preferably close to about a 3/16 or 1/4 inch diameter and actually seldom close beyond the inner radial edges of the membranes between the fruit sections.

In order to keep the moving parts within the housing 72 free of juice, when citrus fruit are being aligned, a water line 110 is connected to the housing and maintains a continuous flow through the housing and out through the swivel connections of the centering pins 102.

As thus far described, it can be seen that the pneumatic actuator 61 and hydraulic-pneumatic actuator 63 will move the vertical support frame 50 and the housing 72 downwardly toward a fruit, which as is shown in FIGURE 8, is positioned below the pins 102. The pneumatic actuator 91 will likewise move the centering pin actuating block 95 downwardly closing the pins 102.

Means is provided to limit the downward movement of the rectangular support frame and the pins so that the depth of penetration of the pins into the fruit will always be a predetermined amount regardless of the size of the fruit. This means is described and claimed in said copending application; however, for the purpose of description it is also shown in FIGURES 3 and 8, and includes a probe tube 112 which is positioned and is free to move within the actuating tube 82. A probe tip 113 in the form of a flat ring is fastened to the lower end of the probe tube. As best shown in FIGURE 3, the upper end of the probe tube is fastened to a cylindrical cap 114 which is slidably positioned in a lifting cup 116. The lifting cup is threaded internally at its upper end to receive a threaded cylindrical plug 117. Adjustably threaded into a hole in the top of the cylindrical plug is the lower end of an actuating rod of a pneumatic actuator 120. The pneumatic actuator is fastened to a crossbar 49 of the rectangular support frame 50 such that upon retraction of its actuating rod the lifting cup pulls the probe tube upwardly relative to the rectangular support frame.

A cam member 121 is fastened to the probe tube 112 adjacent its upper end and engages the contact arm of a switch S2. The switch controls the operation of the pneumatic actuators as will be later described.

The lower centering mechanism 41, best shown in FIGURE 5, is similar to the upper centering mechanism 40 in many respects, the major exceptions being the absence in the lower centering mechanism of the probe tube and its related structure. The lower centering mechanism includes an outer support frame 125 comprised of a pair of spaced vertical frame members 126 which are connected at their lower ends by a cross-piece 128. The upper ends of the vertical frame members are formed in the shape of inverted L's and are welded to a circular clamp 129 (FIG. 6) which substantially circumscribes a cylindrical support 130. The clamp is drawn tight so that the cylindrical support and the outer support frame form a rigid unit. The cylindrical support is also welded to a bracket 131 which is bolted to a horizontal frame member 132. The horizontal frame member is welded to the frame 39 and supports the entire lower centering mechanism.

The centering pins of the lower centering mechanism 41 like the centering pins 102 of the upper centering mechanism 40 must be moved vertically to engage a fruit. To accomplish this a pair of bushings 133 are mounted inside the upper and lower ends of the cylindrical support 130. The bushings circumscribe a lower cylindrical positioning tube 135. The lower cylindrical positioning tube is connected at its lower end by a pair of lock nuts 136 to a horizontal cross bar 137. The cross bar is fastened at either end to a pair of spaced lefthand and righthand vertical bars 138a and 138b, respectively. A lower cross bar 139 connects the lower ends of the vertical bars. The righthand cross bar is tapered at its upper end as at 140 to form a cam surface for a purpose later to be described. The upper end of the lefthand vertical bar is forked (FIG. 2) to straddle and engage both sides of a nylon guide block 141 which is fastened to the lefthand vertical frame member 126. Mounted to the lower cross bar 139 is a pneumatic actuator 143 which has its actuating rod adjustably connected to a clevis 144 which is pivotally connected to the cross-piece 128 of the outer support frame 125. Energizing the pneumatic actuator 143 moves the vertical bars 138a and 138b the lower cylindrical positioning tube 135 upwardly relative to the outer support frame 125.

The upper end of the lower cylindrical positioning tube 135 is circumscribed by a rubber washer 146 and is connected as by welding to a housing 147 of a lower centering assembly 148. As best shown in FIGURE 8, the lower centering assembly 148 is identical to the centering assembly 71 of the upper centering mechanism 40 with the exceptions that the former does not have a protective cover similar to the cover 73 and there is no aperture provided in the bearing plate to accommodate a probe tube as was the case for the bearing plate 75 since there is not probe tube in the lower centering mechanism. Consequently, the lower centering assembly will be only briefly described. Fastened to the upper end of the housing 147 is an adapter ring 149 into which is pressed a bearing 150. A bearing plate 151 is fastened to the inner race of the bearing by cap screws 152. Fastened to the top side of the bearing plate by a plurality of cap screws 153 is a bearing cup 154. The cap screws 153 also mount to the top side of the bearing plate a restraining member 156 having, as mentioned earlier, a plurality of equi-distantly spaced diamond-shaped apertures 109 (FIG. 7).

A lower centering pin actuating assembly 159 comprises a lower actuating shaft 160 which is slidably mounted in a pair of spaced bushings 161 fastened in the lower cylindrical positioning tube 135. The actuating shaft has a threaded bore at its lower end which receive a threaded plug 162 retained by a lock nut 163. Pinned to the lower end of the plug is a clevis 164 which is adjustably fastened to an actuating rod of a pneumatic actuator 165. A set of adjusting nuts 166 are threaded on the shaft 160 to limit its upward movement. The pneumatic actuator is welded to a crossbar 167 which is fastened between the vertical bars 138a and 138b.

Returning again to the lower centering assembly 148, the upper end of the lower actuating shaft is recessed as at 170. A pair of spaced bearings 171 are mounted in the recess and are also mounted to a recessed portion of a lower pin operating block 172. The pin actuating block is provided with a plurality of inclined bores 173 and a vertical bore 174 (FIG. 5). The bearings and thus the actuating blocks are retained on the cylindrical positioning shaft 135 by a lock nut 175. A guide pin 177 (FIG. 5) is slidably mounted in the vertical bore 174 and is fastened to the bearing plate 151. A plurality of elongated centering pins 178 are swivelly mounted in the bearing plate and are held against longitudinaly movement by lock nuts 179 and cylindrical abutments 180 formed on each of the pins. The lower ends of the pins are connected to the ball guides 181 which ride in the inclined bores 173. The upper ends of the pins are tapered. The lower pin actuating block, guide pin, and elongated centering pins are identical to the similar structure in the upper centering mechanism 71 and function in exactly the same manner; however, for grapefruit the adjusting nuts 166 are set to allow the centering pins 178 to close to a much smaller diameter than the centering pins 102, preferably to about $\frac{1}{16}$ inch diameter. A waterline 183 is also connected to the housing 147 and cleanses the moving parts of the lower centering assembly in a manner like the waterline 110.

Referring to FIGURE 8, the fruit support apparatus 189 comprises a base 190 which is supported for free lateral movement on a table 191 by a plurality of bearings 192 fitted into recesses in the base. The table forms a part of the rotary turret 18. The upper surface of the base is recessed to receive a plurality of bearings 194 which support a fruit holding cup 195. A fruit or other article held in the fruit holding cup is thus free to be moved laterally of the table 191 in any direction and is also free to move angularly or rotate about its stem-blossom axis. The table, base and fruit holding cup are all apertured as at 196, 197 and 198, respectively, to permit passage therethrough of the lower centering pins 178.

*Operation*

The operation of the aligning device and in conjunction therewith one form of a method for carrying out the invention may best be described by referring to FIGURES 1, 10 and 11. A grapefruit is placed in a fruit support apparatus 189 at the input station 20. A rough centering light 200, operated in accordance with the description given in the aforementioned patent to Polk, Jr. and the patent to Cox 2,901,087, is positioned over the input station. This centering light shines a beam of light into the centering of the fruit holding cup 195 and the operator aligns the top of the stem-blossom axis of the grapefruit within the beam of light. Accordingly, the grapefruit is roughly aligned with its stem-blossom axis in a generally vertical orientation. The rotary turret 18 is then indexed clockwise (as viewed in FIGURE 1) to the centering station 21. At this time the upper centering mechanism 40 is in its raised positioned and the lower centering mechanism 41 is in its lowered position as shown in the drawings. Simultaneously with the indexing of the rotary turret a conventional timing cam 202, the details of which are not shown but are apparent to anyone skilled in the art, moves out of engagement with the main switch S1 (FIG. 11) which is spring biased closed by a spring 204 to close the contacts of the switch to energize the circuit A. Energization of circuit A energizes the solenoid valves SV17, SV18, SV11, and SV12. SV17 which is normally opened is moved to exhaust and SV18 which is normally connected to the exhaust is opened to the air supply. This causes the cylinder of the pneumatic actuator 143 to be raised carrying with it the lower centering pin actuating assembly 159 and the centering assembly 148. The righthand vertical bar 138b is, accordingly, also raised with its cam surface engaging the operating lever of the switch S3. Normally closed solenoid valve SV11 is opened to the air supply to admit air simultaneously to the lower ends of the actuators 61 and 63. SV12 which is normally opened is simultaneously closed into the exhaust position to exhaust the air on the upper side of the pneumatic actuator 61 and exhaust the air at the top of a combined air and oil tank 205. With the air pressure removed from the top of the oil in the tank, the oil in the top of the actuator 63 is forced out of the actuator through a restriction in a flow control vave 206, through the normally opened solenoid valve SV13 and into the air and oil tank. At this time the pivot arms 67 move both the rectangular support frame 50 and the centering assembly 71 downwardly at a speed controlled by the size of the restriction in the flow control valve. The probe tube 112 is also moved downwardly until it engages the top of the grapefruit in the fruit holding cup 195.

When the probe tube engages the fruit it is halted while the rectangular support frame 50 continues to move downwardly. This causes the actuating arm of the switch S2 to move relative to the cam 121. When the switch contacts of the switch S2 are closed circuit B is energized to moved normally open solenoid valves SV13 and SV14 to the exhaust position; however, since in valve SV13 the exhaust port is blocked the oil is locked in the line and actuator 63. This effectively precludes further movement of the actuators 61 and 63 and holds the rectangular support frame 50 and the centering assembly 71 in a fixed position dependent upon the height of the grapefruit. This locking arrangement allows the pins 102 to enter the top portion of the grapefruit a predetermined distance determined by the position of the cam 121 on the probe tube 112. For grapefruit this distance is preferably ⅝ to ¾ of an inch. SV14 is moved from a normally closed exhausted position to an open position in communication with the air supply. This causes air to simultaneously move the lever arms 88 downwardly to close the centering pins 102, exhausting the air through the flow-control valve 207, and energizing the actuator 120 to remove the probe tube upwardly out of the path of the centering pins.

The righthand vertical bar 138b of the lower centering assembly 148 has meanwhile risen to close the actuating arm of the switch S3 to energize circuit C. Valve SV19 which is normally in the exhaust position is opened to the air supply energizing the pneumatic actuator 165 to close the lower centering pins 178.

When the cam 202 reopens the switch S1 the circuits A, B and C are broken and the valves returned to their normal positions. This causes the centering pins to reopen, the centering assemblies to be retracted and the probe tube 112 dropped down into its normal position between the centering pins 112. A conventional interlock switch system (not shown) is provided as a safety feature to assure the centering assemblies are completely retracted prior to indexing the feeder turret.

As can readily be seen the foregoing has described a unique method and apparatus for aligning articles. While only citrus fruit, particularly grapefruit, have been discussed, it is evident that this device is effective in aligning any article having a tough generally symmetrical surface surrounding or on the axis to be aligned.

It will also be evident that modifications and variations may be made without departing from the novel concepts of the present invention. Accordingly, it is to be understood that the present invention is not limited except by the scope and proper interpretation of the appended claims.

I claim:

1. A device for aligning the stem-blossom axis of citrus fruit having a soft outer flesh and a tough center core running between opposed ends of the fruit and surrounding its stem-blossom axis, means for supporting the fruit for free angular movement of the center core, finger means clustered about a central axis and mounted for movement toward the fruit for penetration into the opposed ends of the fruit at spaced points around its center core, and means for closing said finger means on said tough center core bringing it into alignment with said central axis.

2. The aligning device defined by claim 1 wherein said finger means are mounted for reciprocable movement along said central axis into the fruit.

3. The aligning device defined by claim 1 wherein said finger means include a plurality of elongated pins and a restraining member circumscribing each pin for limiting lateral movement of the pin.

4. The aligning device defined by claim 3 wherein said pins are pivotally mounted and have enlarged bearing members fixed at their ends remote from the fruit and said means for simultaneously closing said pins includes a reciprocable block having guide means for receiving each of said enlarged bearing members, said guide means being equi-distantly spaced in a circle in said block and being inclined outwardly from said pins whereby reciprocable movement of said block moves said bearing members along said guide means and thus pivots said pins.

5. The aligning device defined by claim 1 wherein said finger means are generally vertically aligned.

6. The aligning device defined by claim 1 wherein said finger means include a plurality of elongated pins mounted equi-distantly around a common center and for movement in a first direction toward said center and for more limited movement in a second direction laterally of said first direction.

7. The method of aligning with a common axis the axis of a citrus fruit having a soft outer flesh and a tough center core that surrounds said axis to be aligned, said method comprising the steps of holding the fruit for free angular and lateral movement, penetrating the soft flesh of the fruit at opposite ends thereof at a plurality of spaced points around the axis to be aligned, and pressing against the tough center core of the fruit in a direction toward said common axis at said plurality of spaced points to urge each end of the fruit in a direction toward said common axis.

8. The method defined by claim 7 wherein the step of penetrating the soft flesh is along a path substantially parallel to the stem-blossom axis of the fruit.

9. A device for aligning articles such as fruit which have a relatively soft, fleshy body portion and a relatively hard central core portion, said device comprising a first cluster of pins including at least three pins positioned above an article to be aligned and about an aligning axis, a second cluster of pins including at least three pins positioned below the article to be aligned and about said aligning axis, means for supporting said article for free lateral movement transversely of said aligning axis and for free angular movement with respect to said axis, means for moving the pins of each of said clusters of pins toward said article to penetrate into said fleshy body portion of the article at opposite sides thereof and about said central core portion thereof, and means for moving all of said pins inwardly toward said central core portion of the article to cause the axis of said central core portion to become aligned with said aligning axis.

10. A device accordingly to claim 9 wherein said aligning axis is a vertical axis.

11. A device according to claim 9 including means circumscribing each pin for limiting lateral movement thereof, said means comprising a plate having a diamond-shaped aperture therein surrounding the pin with one of the acute angles of the diamond-shaped aperture extending toward said aligning axis.

12. A device according to claim 10 wherein said means for supporting said article comprises a base supported for free movement transversely of said aligning axis and a cup for receiving said article, said cup being freely movable upon said base so as to vary the angular relationship of a vertical axis of the article with said aligning axis.

13. A device according to claim 10 wherein each of said pins an outer portion which is bent at an angle to the adjacent portion of the pin, said bent portions of the pins normally extending outwardly from said aligning axis during the penetration of the article, said means for moving said pins inwardly comprising means for pivoting said pins so as to move said bent portion into generally vertical positions.

References Cited

UNITED STATES PATENTS

| | | | |
|---|---|---|---|
| 1,725,224 | 8/1929 | Sturges. | |
| 2,937,737 | 5/1960 | Magnuson | 198—33 |
| 3,132,734 | 5/1964 | Polk | 198—33 |
| 3,259,253 | 7/1966 | Grotewald | 198—210 X |
| 2,723,743 | 11/1955 | Carter | 198—33 |
| 3,128,817 | 4/1964 | Shaver | 198—19 X |

RICHARD E. AEGERTER, *Primary Examiner.*

UNITED STATES PATENT OFFICE
CERTIFICATE OF CORRECTION

Patent No. 3,434,583                                                   March 25, 1

Wilber C. Belk

It is certified that error appears in the above identified patent and that said Letters Patent are hereby corrected as shown below:

Column 1, line 51, after "Polk" insert -- Jr. --. Column 3, line 34, "sationary" should read -- stationary --. Column 6, line 53, after "138b" insert -- and --.

Signed and sealed this 14th day of April 1970.

(SEAL)
Attest:

Edward M. Fletcher, Jr.                                WILLIAM E. SCHUYLER, JR.
Attesting Officer                                                Commissioner of Patents